United States Patent
Lee

(10) Patent No.: US 8,223,261 B2
(45) Date of Patent: Jul. 17, 2012

(54) IMAGE CAPTURE DEVICE AND CONTROL METHOD THEREOF

(75) Inventor: Liu-Pin Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 428 days.

(21) Appl. No.: 12/489,612

(22) Filed: Jun. 23, 2009

(65) Prior Publication Data

US 2010/0149357 A1 Jun. 17, 2010

(30) Foreign Application Priority Data

Dec. 11, 2008 (CN) .......................... 2008 1 0306162

(51) Int. Cl.
  *H04N 5/222* (2006.01)
  *G06K 9/40* (2006.01)
(52) U.S. Cl. ....................................... 348/371; 382/274
(58) Field of Classification Search .................. 348/317, 348/362, 370–373
  See application file for complete search history.

(56) References Cited

U.S. PATENT DOCUMENTS

| 6,239,554 B1 * | 5/2001 | Tessadro et al. | 315/149 |
| 7,414,666 B2 * | 8/2008 | Yamaguchi | 348/371 |
| 8,045,002 B2 * | 10/2011 | Gladnick et al. | 348/132 |

FOREIGN PATENT DOCUMENTS

| CN | 1815341 A | 8/2006 |
| TW | 200627049 A | 8/2006 |
| TW | 200838140 A | 9/2008 |

\* cited by examiner

*Primary Examiner* — Trung Diep
(74) *Attorney, Agent, or Firm* — Altis Law Group, Inc.

(57) ABSTRACT

An image capture device includes an image capture unit, a calculation unit, an assist unit, a determination unit, a storage unit, a processing unit and a first assist light control unit. The image capture unit captures information under current ambient illumination conditions. The calculation unit calculates brightness of the current ambient illumination conditions. The assist light compensates the current ambient illumination. The determination unit determines whether the current ambient illumination is sufficient and whether the current ambient illumination has been compensated. The storage unit stores a first control table. The processing unit activates the first assist light control unit when the current ambient illumination is insufficient. The first assist light control unit looks up a corresponding setting in the first control table using the calculated current ambient illumination, and controls the assist light using the acquired setting.

12 Claims, 2 Drawing Sheets

IMAGE CAPTURE DEVICE AND CONTROL METHOD THEREOF

BACKGROUND

1. Technical Field

The present disclosure relates to image capture devices and, particularly, to an image capture device capable of adapting to varying illumination conditions and a control method thereof.

2. Description of the Related Art

Image capture devices such as cameras typically include an assist light unit. When capturing images in low lighting conditions, the assist light unit compensates for the insufficient environmental illumination. However, many commonly used assist light units do not provide functions for adjustment of intensity thereof, thus reducing the units' capability to achieve suitable compensation.

Therefore, it is desirable to provide an image capture device and a control method thereof which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present image capture device and control method thereof Moreover, in the drawings, like reference numerals designate corresponding parts throughout the views.

DETAILED DESCRIPTION

Embodiments of the image capture device and its control method thereof are described in detail here with reference to the drawings.

Figure 1:
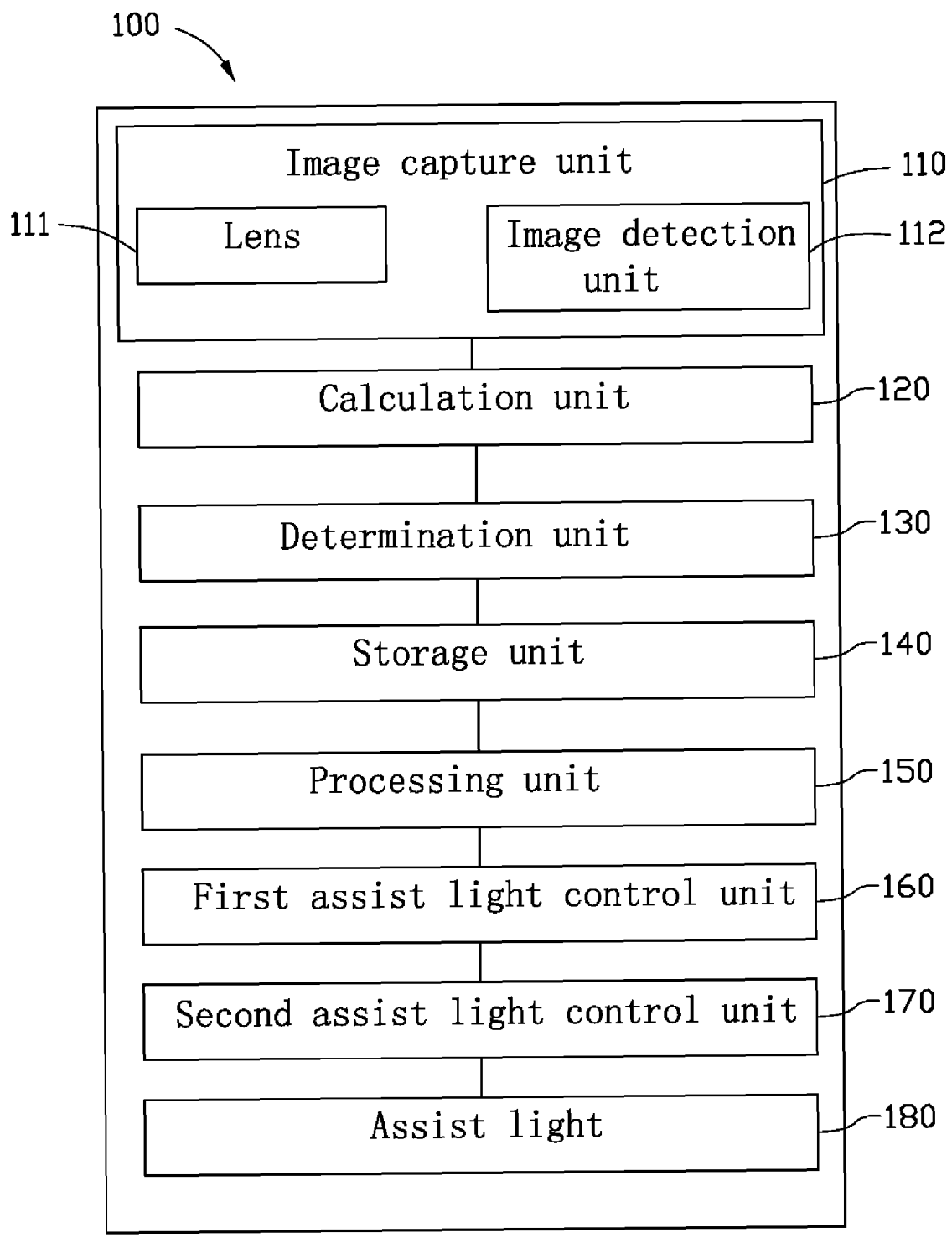
FIG. 1 is a functional block diagram of an image capture device, according to an embodiment.

As shown in FIG. 1, an image capture device 100, such as a digital still camera, includes an image capture unit 110, a calculation unit 120, a determination unit 130, a storage unit 140, a processing unit 150, a first assist light control unit 160, a second assist light control unit 170, and an assist light 180. The assist light 180 is configured for compensating for inadequate ambient illumination for the image capture device 100.

The image capture unit 110 is configured to capture image information in the current ambient illumination with or without supplemental illumination. The image capture unit 110 can include a lens 111 and an image detection unit 112. The lens 111 is configured for capturing optical information. The image detection unit 112, such as a charge-coupled device (CCD) or a complementary metal-oxide semiconductor (CMOS), is configured for converting the captured optical information into corresponding electrical signals.

The calculation unit 120 is configured for reading the electrical signals and calculating brightness of the current ambient illumination (may include assist light illumination) based upon the read electrical signals.

The determination unit 130 is configured for determining whether the current ambient illumination is sufficient. If so, an image is captured without using the assist light 180. If not, the determination unit 130 further determines whether the current ambient illumination has been compensated by the assist light 180.

The processing unit 150 is configured for activating the first assist light control unit 160 if the current ambient illumination has not been compensated or the second assist light control unit 170 if the current ambient illumination has been compensated.

The storage unit 140 is configured for storing a first control table and a second control table (see below). The storage unit 140 may be a semiconductor memory, such as an electrically-erasable programmable read-only memory (EEROM), or a magnetic random access memory (MRAM).

Table 1 shows an example of the first control table. Each pulse-width modulation (PWM) duty circle is associated with a corresponding current ambient illumination and modulated ambient illumination, theoretical values of the ambient illumination in case of the corresponding PWM duty cycles adopted. The PWM duty cycle represents application of different levels of electric current to compensate different brightness of the assist light 180.

TABLE 1

| Current ambient illumination | PWM duty cycle (%) | Modulated ambient illumination |
|---|---|---|
| 20 | 80 | 120 |
| 40 | 70 | 120 |
| 60 | 60 | 120 |
| 80 | 50 | 120 |
| 100 | 40 | 120 |

Table 2 is a second control table.

TABLE 2

| Current ambient illumination | PWM duty cycle (%) | Modulated ambient illumination condition |
|---|---|---|
| 60 | 100 | 120 |
| 80 | 90 | 120 |
| 100 | 80 | 120 |
| 120 | 60 | 120 |
| 140 | 40 | 120 |

The first assist light control unit 160 is configured, if activated by the processing unit 150, to acquire the corresponding PWM duty cycle to control the assist light 180, based upon the current ambient illumination determined by the calculation unit 120. For example, when current ambient illumination is 100, the first assist light control unit 160 will acquire the corresponding PWM duty cycle of 40% from the first control table and apply electric current to charge the assist light 180 using the corresponding PWM duty cycle 40%, and, in theory, the compensated ambient illumination will reach the desired 120.

The second assist light control unit 170 is configured, if activated by the processing unit 150, to acquire the corresponding PWM duty cycle from the second control table to control the assist light 180, based upon the current ambient illumination calculated by the calculation unit 120. For example, when the current ambient illumination is 140, the second assist light control unit 170 will acquire the corresponding PWM duty cycle 40% and apply electric current to charge the assist light 180 using the corresponding PWM duty cycle 40%, and, in theory, the compensated ambient illumination will reach the desired 120.

Figure 2:
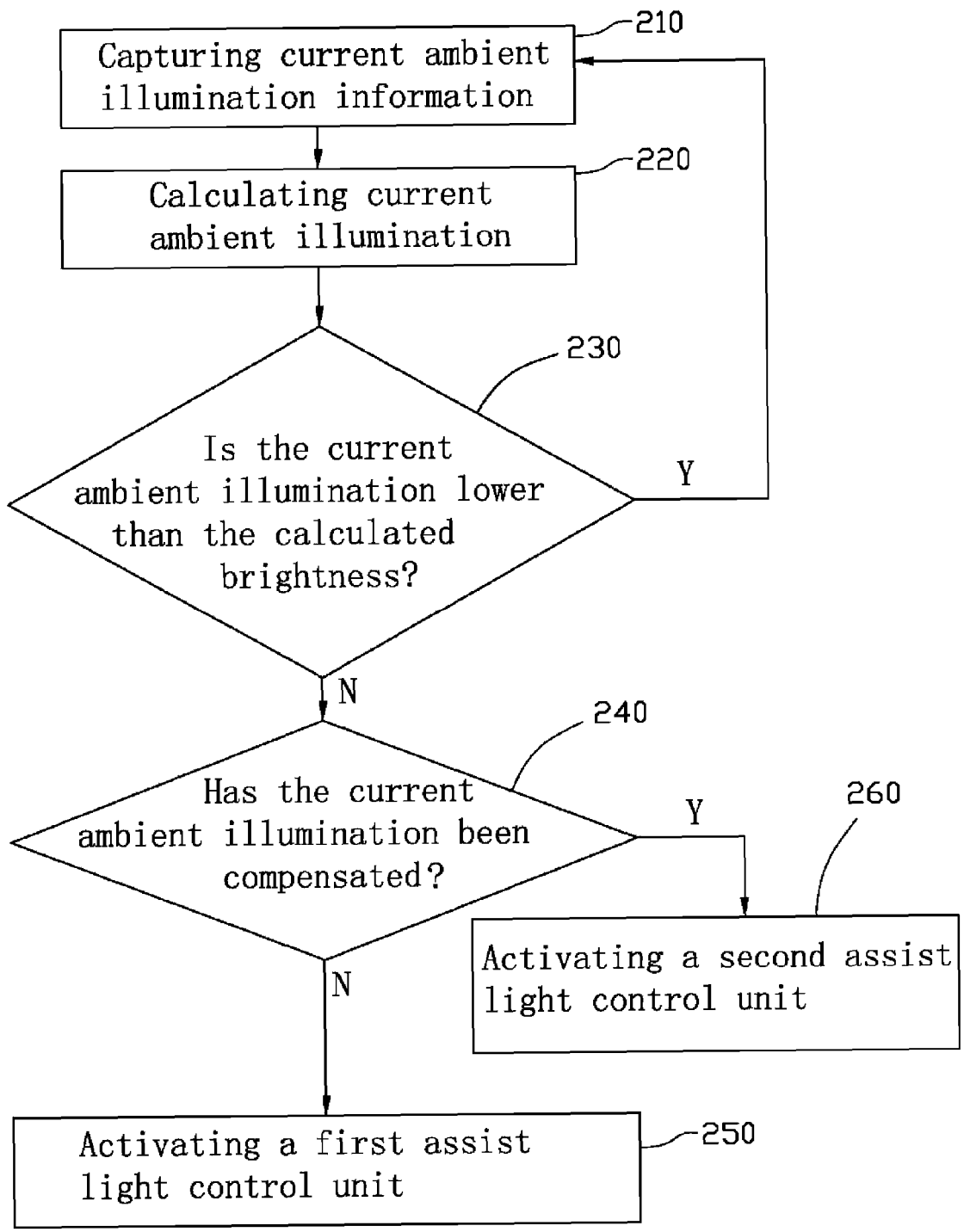
FIG. 2 is a flowchart of a control method of an image capture device, according to an embodiment.

Referring to FIG. 2, an embodiment of a control method may be performed by, for example, the image capture device 100 of FIG. 1.

In step 210, information regarding current ambient illumination with or without supplementary illumination is captured by the image capture unit 110.

In step 220, the current ambient illumination is calculated by the calculation unit 120.

In step 230, it is determined whether the current ambient illumination is lower than the calculated brightness. If not, step 240 is executed. If so, step 210 is executed.

In step 240, it is to be determined whether the current ambient illumination has been compensated by the assist unit 180. If not, step 250 is executed. If so, step 260 is executed.

In step 250, the first assist light control unit 160 is activated corresponding to the first illumination table to modulate the brightness of the assist light 180.

In step 260, the second assist light control unit 170 is activated according to the second control table to modulate the brightness of the assist light 180.

It is noted that the disclosed image capture device provides different illumination of the assist light in use corresponding to the current ambient illumination, thereby reducing power consumption and enhancing the captured image quality.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. An image capture device, comprising:
an image capture unit configured for capturing image information in current ambient illumination conditions;
a calculation unit configured for reading the information and calculating brightness of the current ambient illumination based upon the information;
an assist light configured for lighting to compensate the current ambient illumination;
a determination unit configured for determining whether the current ambient illumination is sufficient and whether the current ambient illumination has been compensated;
a storage unit configured for storing a first control table, the first control table comprising a collection of current ambient illumination levels and a collection of control settings, where each control setting is associated with a corresponding current ambient illumination level which is associated with a corresponding pulse-width modulation (PWM) duty cycle;
a processing unit; and
a first assist light control unit;
wherein when the determination unit determines that the current ambient illumination is insufficient, the processing unit activates the first assist light control unit, the first assist light control unit acquires the corresponding PWM duty cycle based upon the current ambient illumination determined by the calculation unit and sets the assist light using the acquired PWM duty cycle.

2. The image capture device of claim 1, the storage unit further storing a second control table.

3. The image capture device of claim 2, further comprising a second assist light control unit configured for acquiring a corresponding setting in the second control table using the calculated current ambient illumination, and setting the assist light using the acquired setting, the processing unit being further configured for activating the second assist light control unit.

4. The image capture device of claim 1, wherein the image capture unit includes a lens and an image detection unit, the lens being configured for optically capturing the information and the image detection unit being configured for converting the captured information into corresponding digital signals.

5. The image capture device of claim 1, wherein the image detection unit is a Charge Coupled Device or a Complementary Metal Oxide Semiconductor.

6. The image capture device of claim 1, wherein the storage unit is an electrically-erasable programmable read-only memory or a magnetic random access memory.

7. A control method for an image capture device, comprising:
providing a storage for storing control tables, the control tables comprising a collection of current ambient illumination levels and a collection of control settings, where each control setting is associated with a corresponding current ambient illumination level which is associated with a corresponding pulse-width modulation (PWM) duty cycle;
capturing information under current ambient illumination conditions via an image capture unit;
calculating current ambient illumination conditions of the captured information;
determining whether the current ambient illumination is sufficient; and
acquiring the corresponding PWM duty cycle to control an assist light to compensate the current ambient illumination, if the current ambient illumination is not sufficient.

8. The control method of claim 7, further comprising determining whether the current ambient illumination has been compensated after an insufficiency determination of the current ambient illumination.

9. An image capture device, comprising:
an image capture unit configured for capturing image information in current ambient illumination conditions;
a calculation unit configured for reading the information and calculating brightness of the current ambient illumination based upon the information;
an assist light configured for compensating current ambient illumination;
a determination unit configured for determining whether the current ambient illumination is sufficient and determining whether the current ambient illumination has been compensated;
a storage unit configured for storing a first control and second control tables, both the first control and second control tables comprising a collection of current ambient illumination levels and a collection of control settings, where each control setting is associated with a corresponding current ambient illumination level which is associated with a corresponding pulse-width modulation (PWM) duty cycle;
a first assist light control unit configured for acquiring a corresponding PWM duty cycle in the first control table using the calculated current ambient illumination, and setting the assist light using the acquired PWM duty cycle;
a second assist light control unit configured for acquiring a corresponding PWM duty cycle in the second control table using the calculated current ambient illumination, and setting the assist light using the acquired PWM duty cycle; and a processing unit configured for activating the first assist light control unit if the current ambient illumination has not been compensated, or the second assist light control unit if the current ambient illumination has been compensated.

10. The image capture device of claim 9, wherein the image capture unit includes a lens and an image detection unit, the lens being configured for optically capturing the information and the image detection unit being configured for converting the captured information into corresponding digital signals.

11. The image capture device of claim 10, wherein the image detection unit is a Charge Coupled Device or a Complementary Metal Oxide Semiconductor.

12. The image capture device of claim 9, wherein the storage unit is an electrically-erasable programmable read-only memory or a magnetic random access memory.

* * * * *